(12) United States Patent
Chen

(10) Patent No.: US 6,919,819 B1
(45) Date of Patent: Jul. 19, 2005

(54) SUNSHADE BOARD

(75) Inventor: Chien-Yuan Chen, Banchiaun (TW)

(73) Assignee: Power Data Communication Co., Ltd., Taipei (TW)

( * ) Notice: Subject to any disclaimer, the term of this patent is extended or adjusted under 35 U.S.C. 154(b) by 0 days.

(21) Appl. No.: 10/366,318

(22) Filed: Feb. 14, 2003

(51) Int. Cl.$^7$ .................................................. G08G 1/00
(52) U.S. Cl. ..................... 340/901; 340/435; 340/436; 340/426.1; 296/97.1
(58) Field of Search ................................ 340/901, 435, 340/436, 426.1; 296/97.1, 97.8, 97.11, 97.12; 224/312

(56) References Cited

U.S. PATENT DOCUMENTS

| | | | | |
|---|---|---|---|---|
| 5,280,555 A | * | 1/1994 | Ainsburg | 385/116 |
| 5,291,261 A | * | 3/1994 | Dahl et al. | 356/3.02 |
| 5,473,938 A | * | 12/1995 | Handfield et al. | 73/146.5 |
| 6,072,391 A | * | 6/2000 | Suzuki et al. | 340/468 |
| 6,285,778 B1 | * | 9/2001 | Nakajima et al. | 382/104 |
| 2004/0022137 A1 | * | 2/2004 | Campbell et al. | 369/1 |

* cited by examiner

Primary Examiner—Anh V. La

(57) ABSTRACT

The present invention provides an improved sunshade board, the sunshade board comprises: a digital radio device that comprises at least one memory card socket, operate display panel, a sense display device that comprises at least one display screen, optical coupling member. The present invention decreases volume of radio device, and decreases taken room by putting digital music through memory card. And the memory card has small volume and large capacity, and is room-saving, easy-taking, and sense objects by optical coupling member, and can transfer sense results with board degree and high security to display screen disposed on sunshade board.

1 Claim, 2 Drawing Sheets

SUNSHADE BOARD

BACKGROUND OF THE INVENTION

1. Field of the Invention

The present invention provides an improved sunshade board, especially relates to a digital sunshade board having digital sound device and digital alarm device.

2. The Traditional Technique

With the digital age approach, many devices can be replaced by digital member, there is a sample of automobile, the sound device has developed from traditional radio, tape to CD, although the effect of sound has been improved, the volume of entity sound device cannot be decrease. Usually, automobile sound device is set under the meter panel and take much room. At the same time, tape or CD must take much storage room, and, the rear mirror or driving mirror is used for observing objects behind automobile, but naked eye observe will be defined by degree, light and often cannot observe all the degree and result in many dangerous.

SUMMARY OF THE INVENTION

The main object of the present invention is to provide an improved sunshade board, especially a digital sunshade board having digital sound device and digital alarm device.

The second object of the present invention is to provide an improved sunshade board, which input digital music by memory card, decreases volume of radio device, and decreases taken room by putting digital music through memory card. And the memory card has small volume and large capacity, and is room-saving, easy-taking, Another object of the present invention is to provide an improved sunshade board, which sense object by optical coupling member, and transfers sense result in board degree and high security back to display screen disposed on sunshade board.

Figure 1:
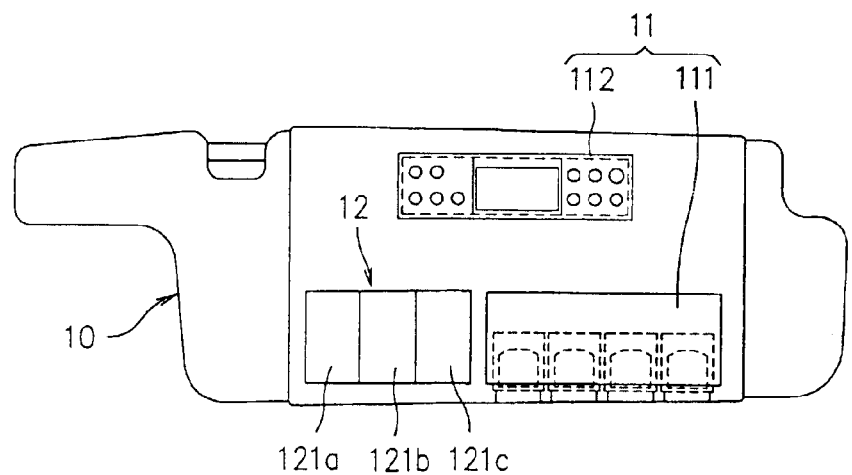
FIG. 1 is a diagrammatic view of the preferred embodiment of the present invention.

DESCRIPTION OF SYMBOLS OF DRAWINGS 10 sunshade board
11 digital sound device
111 memory card socket
112 operate display panel
113 digital signal process unit
114 digital music process unit
12 sense display device
121a left indicator screen
121b right indicator screen
121c rear indicator screen
122a left optical coupling member
122b right optical coupling member
122c rear optical coupling member
123 control member
20 automobile
21 left front light
22 right front light
23 rear cove

DETAILED DESCRIPTION OF THE PREFERRED EMBODIMENT

The present invention will now be described in further detail hereinafter, with reference to accompanying drawing.

Figure 2:
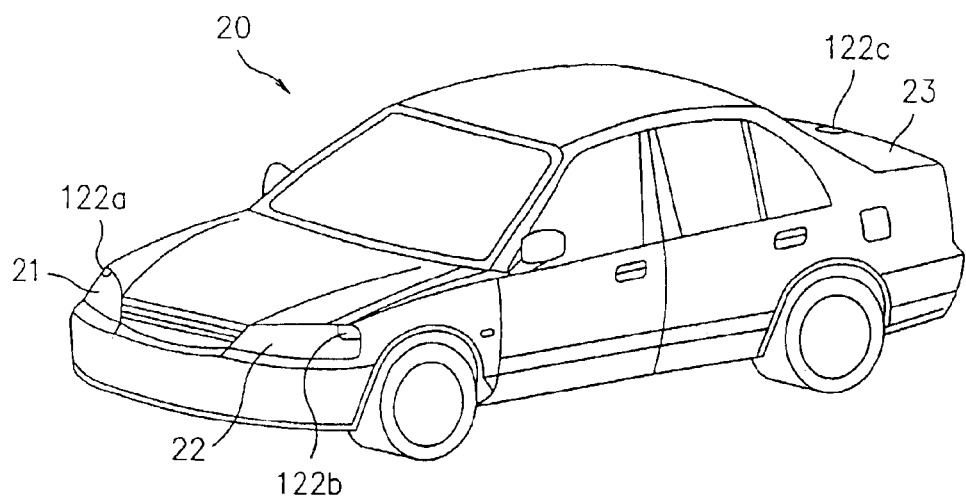
FIG. 2 is a position diagrammatic view of the optical coupling member of the present invention.

Please refers to FIG. 1 and FIG. 2, an improved sunshade board of the present invention, said sunshade board 10 comprises:

A digital sound device 11, which comprises at least one memory card socket 111, operate display panel 112; the memory card socket 111 is used for big capacity, small volume memory card (not shown) inserting into to play music signal that stored in memory card, and adjust voice, tone by operate display panel 112; the operate display panel 112 connect with output device such as loudspeaker. We will not describe the traditional technique.

A sense display device 12 that comprises left indicator screen 121a, right indicator screen 121b, rear indicator screen 121c, and left optical coupling member 122a disposed on the appropriate position of automobile 20 and is used for sensing objects outer the automobile 20, right optical coupling member 122b, rear optical coupling member 122c. The left indicator screen 121a, right indicator screen 121b, rear indicator screen 121c may be liquid crystal indicator screen. As shown in drawings, the left optical coupling member 122a is disposed on the left front light 21 of automobile 20, the right coupling member 122b is disposed on the right front light 22 of automobile 20,the rear optical coupling member 122c is disposed on rear cover 23 of automobile 22, of course those may be disposed on the other parts of automobile 20.

Figure 3:
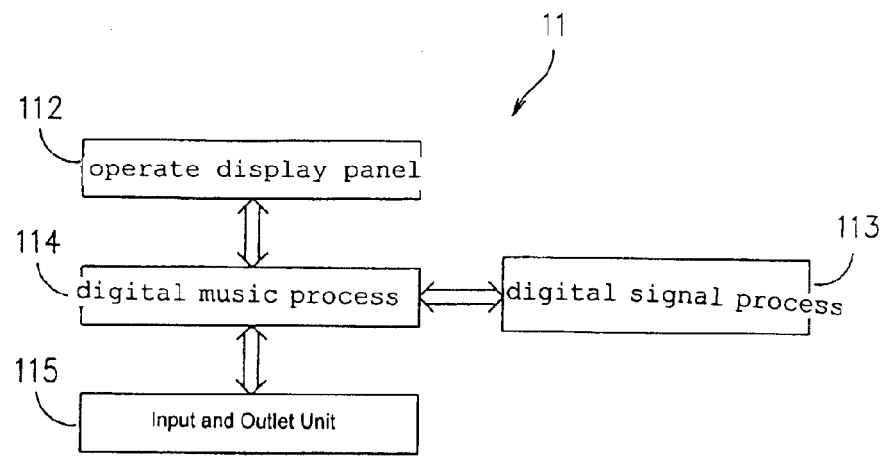
FIG. 3 is a transfer block diagram of digital sound device of the present invention.

Please refers to FIG. 3, the digital sound device transfer block diagram of the present invention, the present invention processes sound and light signal that transferred by digital music process member 114 by digital signal process unit (DSP) 113 and transfers those signal to operate display panel 112 and input and output process unit 115. Digital signal process unit 113 is a high effective single wafer micro process unit that process analogy signals such as voice and light and can conformity information, video, letter and sound effect to instant media application device, which is small volume, powerful, high operate velocity, convenient-use, low-cost, so to be an ideal device when be set on sunshade board of automobile.

Figure 4:
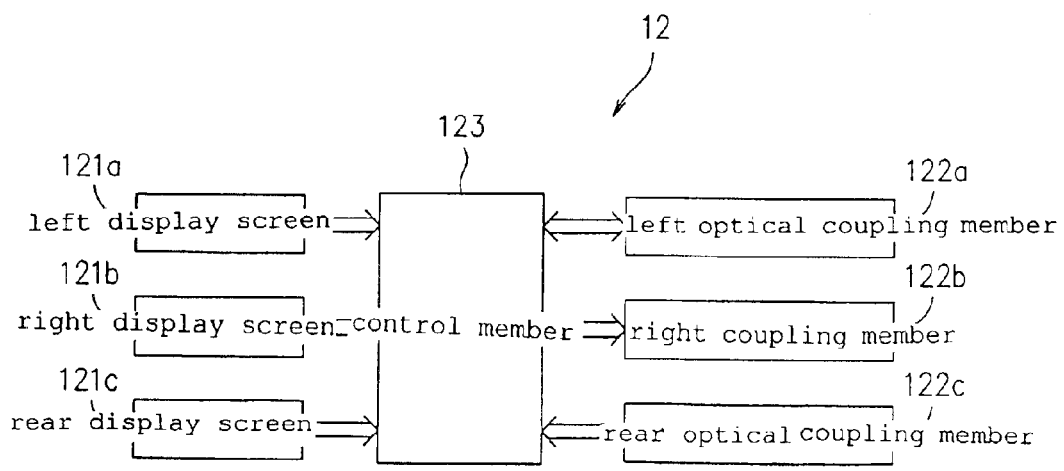
FIG. 4 is a transfer block diagram of optical coupling member of the present invention.

Please refers to FIG. 4, optical coupling member transfer block diagram of the present invention, the left optical coupling member 122a, right coupling member 122b, rear optical coupling member 122c will transfer sense results to control member 123, and control member 123 control left indicator screen 121a, right indicator screen 121b, rear indicator screen 121c to display the local condition that sensed by left optical coupling member 122a, right optical coupling member 122b, rear optical coupling member 122c to provide driver with the most correct information.

Conclude from above-mentioned, the present invention making the best of sunshade room to make digital sunshade extend the effect of sunshade board that only has the effect of sunshade originally. The industrial application of the present invention is obvious. While the present invention has been described above with reference to a preferred embodiment, and various modifications may be made without departing from the scope of the inventions and defined by the appended claims.

What is claimed is:

1. A sunshade board with a sense indicator device of a vehicle, comprising:
   an operate display panel, being disposed at the upper part of the sunshade board;
   at least a memory card socket, being disposed at the lower part of the sunshade board and electrically connected to the operate display panel via a digital signal process unit;
   at least an indicator screen, being arranged side by side and disposed at a lateral side of the memory card socket; and
   at least an optical coupling member, being disposed at the outer side of the vehicle corresponding to the indicator screen respectively and being electrically connected to the indicator screens via a control member;
   whereby, music can be played once the memory card in inserted into the memory card socket and the operate display panel being operated and information, sensed with the optical coupling member can be shown on the indicator screen.

* * * * *